United States Patent [19]

Boisdon

[11] Patent Number: 4,725,939
[45] Date of Patent: Feb. 16, 1988

[54] SYSTEM FOR SUPPLY OF DIRECT CURRENT TO AT LEAST TWO ELECTRICAL LOADS WITH A COMMON POLARITY, IN PARTICULAR FOR MULTIPLE ELECTRIC ARCS

[75] Inventor: Claude Boisdon, Avon, France

[73] Assignee: Jeumont-Schneider Corporation, Puteaux cedex, France

[21] Appl. No.: 913,982

[22] Filed: Oct. 1, 1986

[30] Foreign Application Priority Data

Oct. 4, 1985 [FR] France .................. 85 14714

[51] Int. Cl.⁴ .......................... H02M 7/155
[52] U.S. Cl. ........................ 363/70; 363/88; 373/108
[58] Field of Search .................. 363/69–70, 363/85–88, 128–129; 373/102, 104, 108

[56] References Cited

U.S. PATENT DOCUMENTS

| | | | |
|---|---|---|---|
| 3,949,151 | 4/1976 | Kerton | 373/108 |
| 3,953,781 | 4/1976 | Forster et al. | 363/70 |
| 4,586,188 | 4/1986 | Buhler | 373/108 |

*Primary Examiner*—Peter S. Wong
*Attorney, Agent, or Firm*—Rines and Rines; Shapiro and Shapiro

[57] ABSTRACT

A system for supply of direct current to at least two electrical loads having a common polarity, especially for power supply to an arc furnace with several electrodes or to plasma generators, comprises a set of load-controlled rectifiers (7) arranged in a Graetz bridge (A, B, C), in parallel upon a common alternating current power supply (5, 6). The half-bridges ($A_2$, $B_2$, $C_2$) situated on the common-polarity side have a common dephasing control voltage, while the half-bridges ($A_1$, $B_1$, $C_1$) situated on the other side are each controlled individually. This mechanism can be used in particular for power supply to arc furnaces or plasma torches.

10 Claims, 4 Drawing Figures

SYSTEM FOR SUPPLY OF DIRECT CURRENT TO AT LEAST TWO ELECTRICAL LOADS WITH A COMMON POLARITY, IN PARTICULAR FOR MULTIPLE ELECTRIC ARCS

The present invention concerns a system for supply of direct current to at least two electrical loads with a common polarity and is applicable in particular to arc furnaces and plasma generators.

It is known that it is advantageous for certain electrical loads to be powered with direct current, notably arcs utilized in arc furnaces or plasma generators. There results for example, less electrode consumption, and more stable operation vis-a-vis the power supply network.

These loads are often multiple, and simultaneous in operation, as in the case of an arc furnace with several electrodes. In addition, a common equipotential point is frequently imposed on one polarity, either for operational reasons, as in the case of the bath of an arc furnace, or for reasons of safety of use, as in the case of plasma torches.

At the present time, the majority of installations of this type are powered with alternating current. It is advantageous to reuse the existing alternating current transformer in the case of a modernization or to utilize a common alternating current transformer or power supply network in the case of a new installation, while preserving the possibility of carrying out an individual electronic conversion and individual control of the voltages and currents applied to each load.

The present invention has specifically as its object to fulfill these criteria. Toward this end, the invention provides a power supply system which is essentially characterized in that it comprises a set of load-controlled rectifiers arranged in a Graetz bridge in parallel from a common alternating current power source, with the half-bridges situated on the side of common polarity having a common dephasing control voltage, while the half-bridges on the other side are each controlled individually.

It is thus possible, as will be seen more clearly through the following description, to reduce the mutual reactions between the different bridges, and to equilibrate the currents statically and dynamically, at the same time implementing the necessary protections.

In summary, in a first embodiment of the invention, the common dephasing control voltage is normally constant, and varies only above predetermined intensity threshold.

In a variation, the common dephasing control voltage is calculated from the control voltages of the other half-bridges.

This may involve the average of the control voltages of the other half-bridges, or a signal from an indicator voltage whose reference is half of the arc voltage.

Of course, above an intensity limit threshold, the dephasing of the common-polarity-side half-bridges is also increased, in order to maintain control of the short-circuit current.

Advantageously, a smoothing coil is placed in series with each of the common-polarity-side half-bridges, which enables reinforcement of dynamic equilibration.

Also, preferably, an individual voltage drop proportional to the current intensity is provided in each of the common-polarity-side half-bridges, in order to increase still further the effect of dynamic equilibration.

Several embodiments of the invention are described below by way of example, with reference to the appended drawings, in which.

Figure 1:
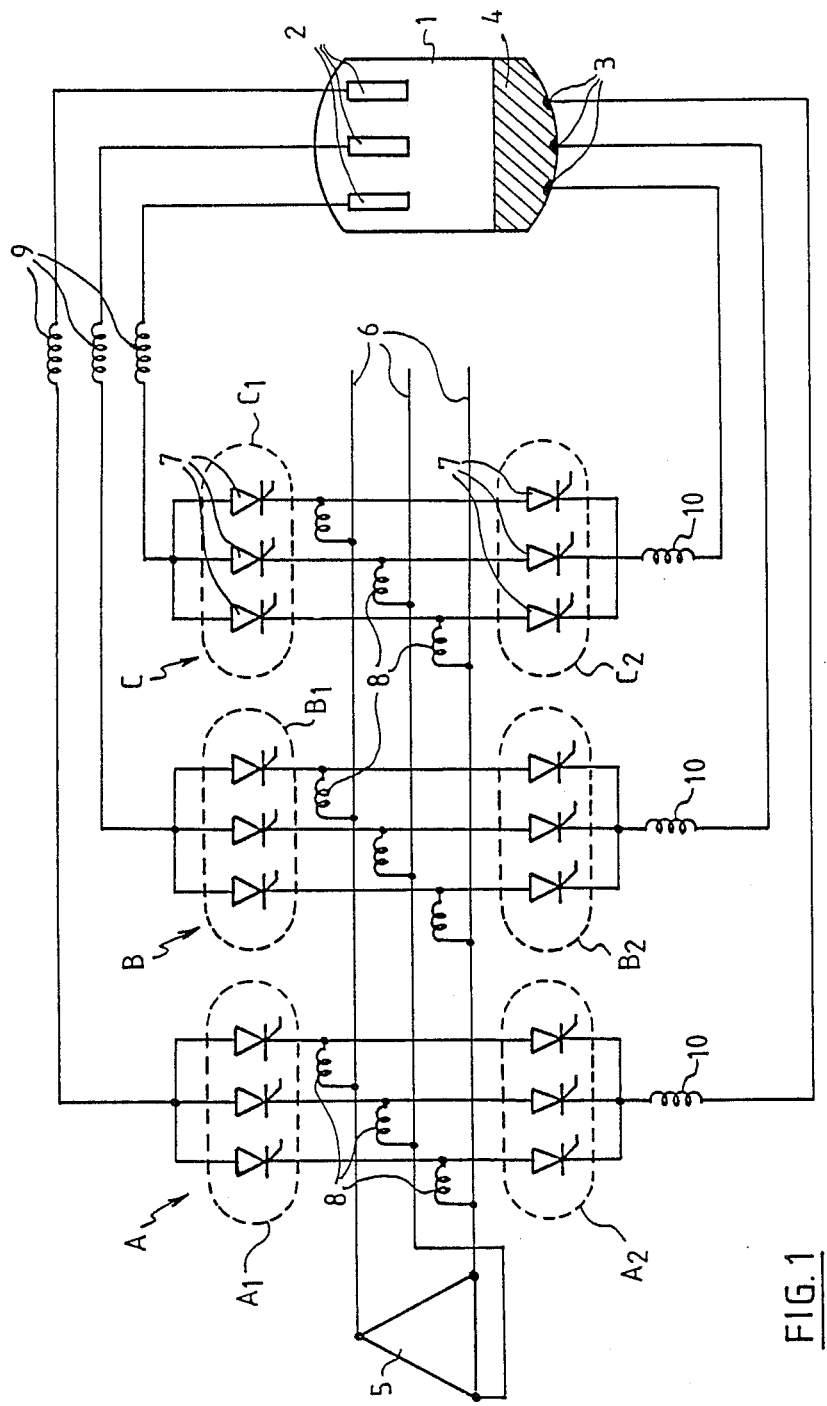
FIG. 1 is a schematic drawing of a power supply system according to the invention, in its particular application for an arc furnace with three movable electrodes.

The power supply system represented in FIG. 1 is designed to supply direct current to an electric arc furnace 1 comprising three movable electrodes 2. In the example represented, the furnace 1 also comprises three base electrodes 3 of the same polarity coupled to one another, through the intermediary of a fusion bath 4. The system thus behaves as if there were only a single base electrode.

Power is supplied from a three-phase alternating current transformer, whose secondary 5, for example a delta, is connected to a set of bars 6. Each of the movable electrodes 2 of the furnace 1 is powered by a converter formed by a set or group of controlled rectifiers, here constituted by thyristors 7, arranged in a Graetz bridge. In FIG. 1 there are three such bridges respectively labelled A, B and C. There is thus a half-bridge of three thyristors, (or set of thyristors in parallel), $A_1$, $B_1$ or $C_1$ connecting the alternating current supply to each movable electrode, and a half-bridge of three thyristors (or set of thyristors in parallel) $A_2$, $B_2$ or $C_2$ connecting the alternating current supply to each base electrode.

The three thyristor bridges A, B and C are connected in parallel with one another to the set of bars 6 of the common alternating current power supply, through the intermediary of decoupling coils 8. A smoothing coil 9 is placed in series between each of the half-bridges $A_1$, $B_1$ and $C_1$ and the corresponding movable electrode 2. Moreover, it is advantageous for an additional smoothing coil 10 to be placed in series between each of the half-bridges $A_2$, $B_2$ and $C_2$ and the corresponding base electrode 3.

In accordance with the invention, the dephasing and control of the thyristors of the half-bridges $A_1$, $B_1$, $C_1$ are dissociated from control of the half-bridges $A_2$, $B_2$, $C_2$. The half-bridges $A_1$, $B_1$, $C_1$ have independent dephasing angles, and are each controlled individually, while the half-bridges $A_2$, $B_2$, $C_2$ have a common dephasing control voltage.

Thus, the half-bridges $A_1$, $B_1$, $C_1$ have independent function, and are in the blocking state or conducting state according to variations in the arc voltage. Their dephasing angle limit is regulated by a marker stop which is variable as a function of the current. This dephasing angle limit can be for example equal to 155°, so that commutation of any short-circuit current is still possible.

Conversely, the half-bridges $A_2$, $B_2$, $C_2$ have a common control, yielding practically identical dephasing and adapted to the operating point of the arc furnace. In fact, these three half-bridges are connected in parallel, and the current division imposes the same rectified voltage for these half-bridges, and thus the same dephasing angle. The ignition delay angle will be greater than a limit value of 25°, for example, which enables a resultant voltage of zero to be attained, without imposing upon the half-bridges $A_1$, $B_1$, $C_1$ a dephasing angle greater than the chosen limit angle of 155°, which would cause a risk of failure of commutation to arise.

The decoupling coils 8, necessary to preserve, even in case of simultaneous ignition, a common alternating current sufficient for starting, also provide to the individual voltage/current characteristic a bias which ensures a natural equilibration of currents. The additional smoothing coils 10 reinforce this dynamic equilibration. In addition, this effect can be further increased by imposing upon each of the half-bridges $A_2$, $B_2$, $C_2$ a supplementary voltage drop, by a complementary dephasing of the control, as a function of the output current of each group.

Figure 2:
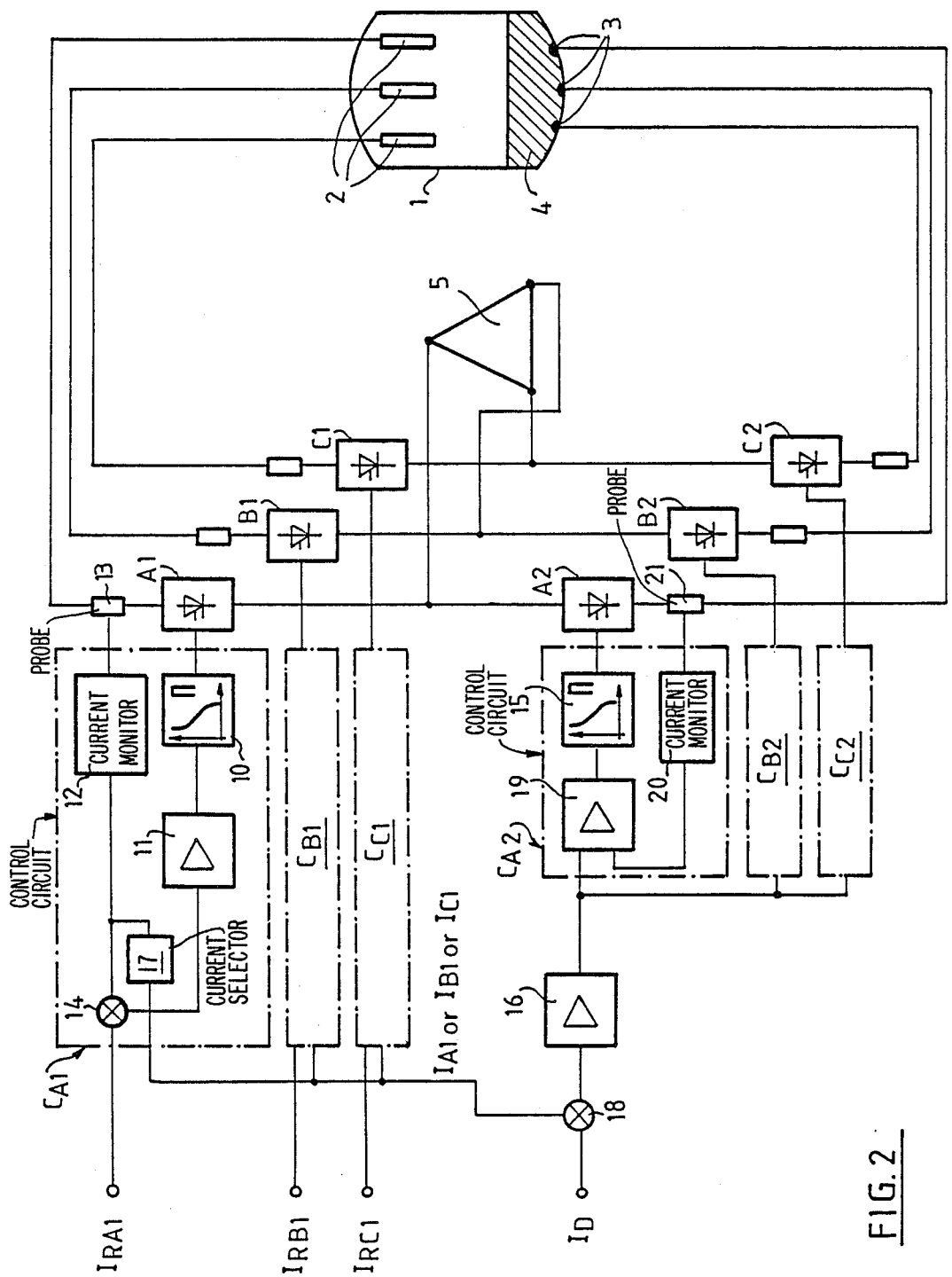
FIG. 2 is a schematic drawing of a control circuit for this power supply system.

The schematic diagram of FIG. 2 represents an embodiment of a control circuit of the different converters A, B, C fulfilling the requirements outlined above.

In this example, each of the half-bridges $A_1$, $B_1$, $C_1$ is associated with a control assembly, respectively $C_{A1}$, $C_{B1}$, $C_{C1}$, comprising a dephaser, and individual ignition impulse generator, such as 10, whose control voltage is output from a regulator, for example a current regulator 11. The current signal is measured at each of the output bars supplying the loads, by a receptor, such as 12, associated with a probe 13. This current signal is compared to a reference current $I_{RA1}$ of the corresponding electrode, by a comparator 14, and the difference is amplified by the regulator 11 in order to control the dephaser 10.

The regulation in normal conditions of the individual output current of the half-bridges $A_1$, $B_1$, $C_1$ is thus dependent solely on these control assemblies $C_{A1}$, $C_{B1}$, $C_{C1}$. As for the half-bridges $A_2$, $B_2$, $C_2$, they are each also associated with a control assembly, respectively $C_{A2}$, $C_{B2}$, $C_{C2}$, comprising an individual dephaser and ignition impulse generator, such as 15. However, in accordance with the invention, the three dephasers are subjected to a control signal issuing from a single current limiting amplifier 16.

The greatest of the currents $I_{A1}$, $I_{B1}$, $I_{C1}$ of all of the loads is selected at the level of the three control assemblies $C_{A1}$, $C_{B1}$, $C_{C1}$ by means of a unit such as 17, which can be constituted, for example, by a simple diode. This current is comparator 18 with a predetermined limit value, as the default current $I_D$. The difference is then corrected by the amplifier 16, which simultaneously retards the ignition of the three half-bridges $A_2$, $B_2$, $C_2$ through the intermediary of the dephasers 15.

Moreover, it is advantageous for a correction amplifier such as 19 to be placed before each dephaser 15, in order to introduce a voltage drop as a function of the output current of each group, the output current being fed to a current receptor such as 20 associated with a probe 21. More specifically, this correction amplifier 19, by variation of the control of the corresponding dephaser 15, adds a complementary voltage drop in proportion to the output current of the group in question.

With such a control circuit, the half-bridges $A_2$, $B_2$, $C_2$ delivers a constant common positive voltage component, whose limit is established by the minimum delay angle defined above. The rectified voltage applied to each electrode is thus the sum of the common positive voltage component and another voltage component, positive or negative. It can thus vary from zero to the maximum voltage in all intensity regions, without risk of failure of commutation.

In the neighborhood of zero voltage or the average voltage, the reactive energy consumption is reduced, by reason of the staggering of the ignitions. In addition, in the neighborhood of zero voltage, the nominal capacity of the transformer is greatly increased, because of the the current flow characteristics.

It will be noted in addition that the association of a second analogous power supply mechanism powering other loads at the same point of operation but with a different transformer coupling, bringing about a 60° staggering of the alternating current voltages supplied, will, in a familiar fashion, enable neutralization of the even-rank harmonics which could exist with such a mode of control.

Figure 3:
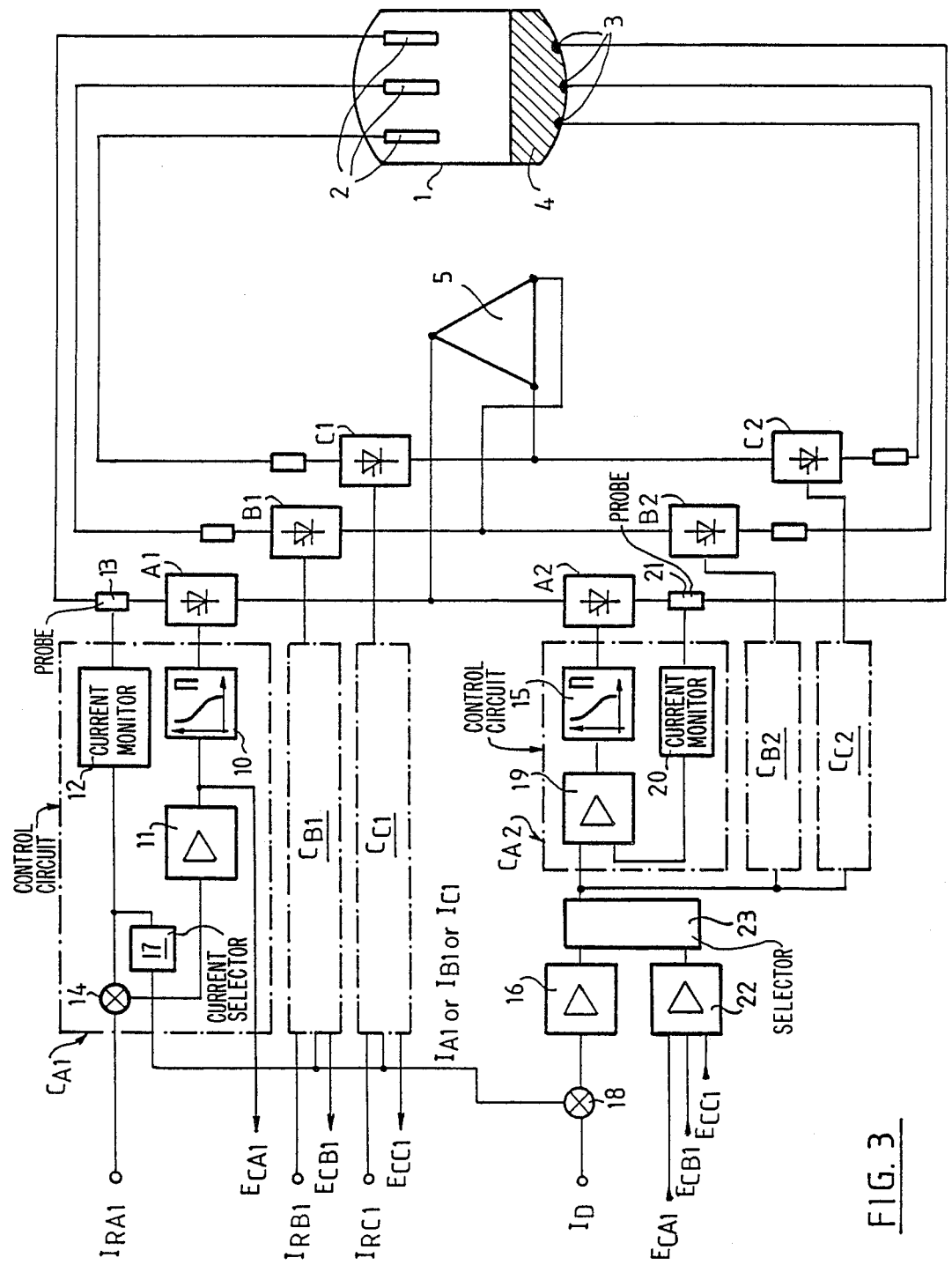
FIG. 3 is a schematic drawing of a variation of the control circuit.

In the modified embodiment represented in FIG. 3, there is in addition a calculating operator 22, supplied with the three control voltages $E_{CA1}$, $E_{CB1}$, $E_{CC1}$ of the three half-bridges $A_1$, $B_1$, $C_1$. This operator carries out a certain function of the three voltages, such as their arithmetic mean, and the signal thus obtained, after filtering, is applied simultaneously to the three control assemblies $C_{A2}$, $C_{B2}$, $C_{C2}$, through the intermediary of a selector 23.

Figure 4:
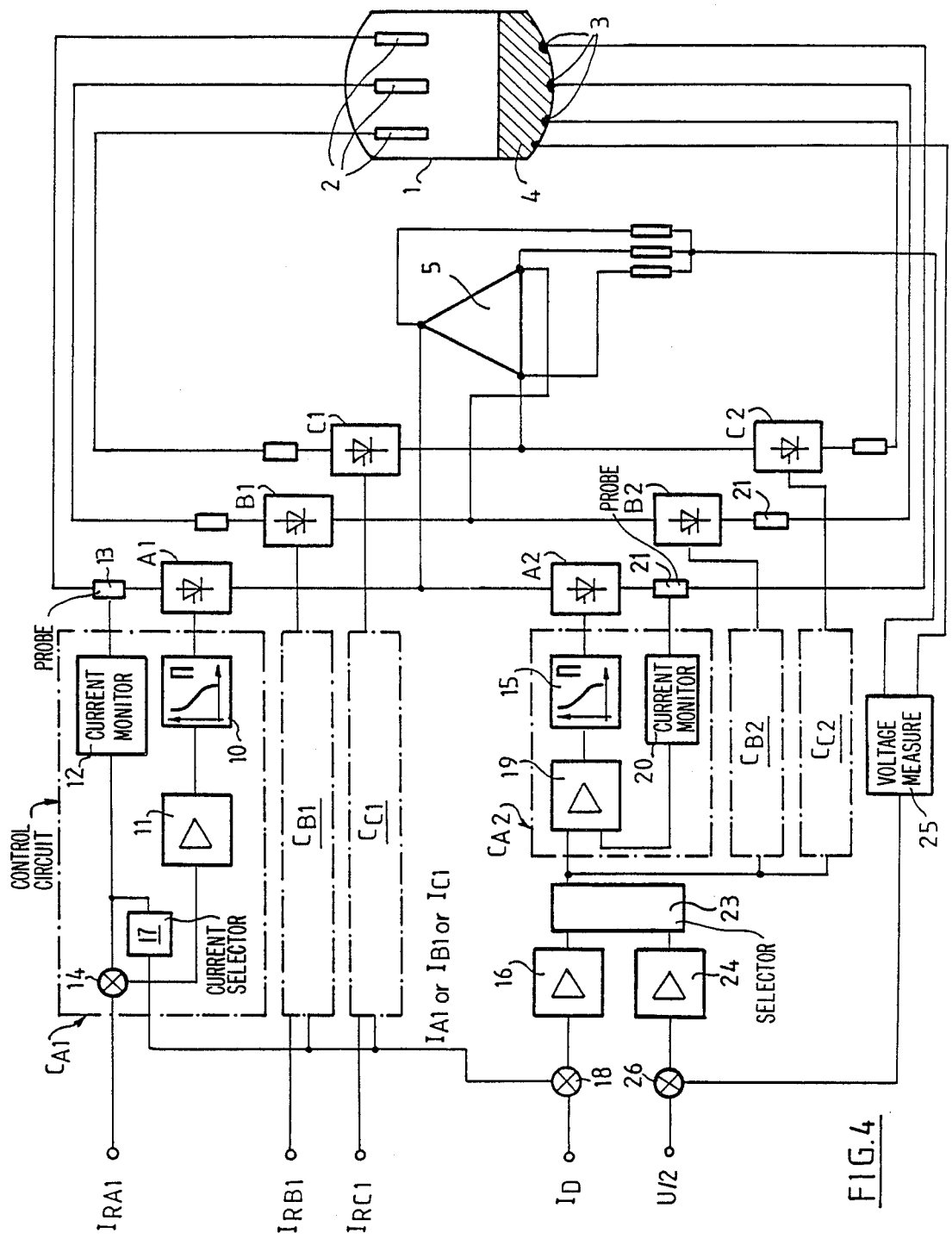
FIG. 4 is a schematic drawing of another variation of the control circuit.

In another variation, represented in FIG. 4, the calculation operator 22 is replaced by a regulator 24, which is voltage-coupled. The rectified voltage coming from the half-bridges $A_2$, $B_2$, $C_2$ is measured with respect to the true neutral of the power supply secondary, or with respect to the reconstructed neutral, as in this case, when the secondary is a delta, by means of a voltage receptor 25, to be compared with the half-reference of the arc voltage $U/2$ in a comparator 26. Any difference is then corrected by the voltage regulator 24, which then delivers a common control signal to the different dephasers 15 through the intermediary of the selector 23.

In these last two modes of embodiment, the half-bridges $A_2$, $B_2$, $C_2$ have a common rectified voltage, coupled to be identical to the mean of the rectified voltage of the half-bridges $A_1$, $B_1$, $C_1$. The operation is thus quasi-hexiphase in the non-perturbed region, when the statistical addition effects of harmonics are taken into account.

It will be noted in addition that in the three modes of embodiment described, the operation in the default mode is identical. In the region of short circuit on the load, the action of the regulation on the half-bridge $A_1$, $B_1$, or $C_1$ of the electrode involved maintains the current within normal limits, and this action is accompanied above a certain current threshold by a complementary dephasing of the half-bridges $A_2$, $B_2$, $C_2$.

I claim:

1. A power supply system for use in providing DC power to multiple arc furnace electrodes and the like, comprising:
  an AC power source,
  a plurality of electrical loads each having a first terminal and a second terminal, the respective second terminals of said electrical loads being coupled so as to have a common polarity,
  a plurality of rectifier bridges each connecting a corresponding one of said electrical loads to said AC power source for supplying DC power to said electrical loads,
  each rectifier bridge including a respective set of controllable rectifiers arranged in a Graetz bridge configuration having a first half-bridge connecting said AC power source to said first terminal of the corresponding electrical load and a second half-bridge connecting said AC power source to said second terminal of the corresponding electrical load, each first half-bridge being independently controlled by a respective control unit including dephaser means for providing rectifier control signals to control inputs of the controllable rectifiers of that first half-bridge, a load monitoring circuit connected to monitor the corresponding electrical load, and means connected to an output of said load monitoring circuit and applying dephasing control signals to said dephaser means to adjust the phasing of said rectifier control signals in accordance with a parameter of the DC power applied to the first terminal of the corresponding electrical load, each second half-bridge being controlled by additional dephaser means connected for applying rectifier control signals to control inputs of the controllable rectifiers of that second half-bridge, and control means connected for applying dephasing control signals to said additional dephaser means, the phasing of the rectifier control signals applied to each second half-bridge by said additional dephaser means being adjusted in accordance with a common dephasing control signal applied to said additional dephaser means by said control means.

2. A power supply system according to claim 1, wherein said second half-bridges are controlled by corresponding additional control units connected respectively thereto, each additional control unit including a dephaser which is connected for applying rectifier control signals to at least one of the controllable rectifiers of the corresponding second half-bridge and which has an input connected to a respective load monitoring circuit connected to monitor the corresponding electrical load and applying a dephasing control signal to said dephaser in accordance with a parameter of the DC power applied to the second terminal of that load, said dephaser input also being connected to said control means and receiving said common control signal.

3. A power supply system according to claim 1, wherein said control means provides a normally constant dephasing control signal to said additional dephaser means, but varies that control signal when a predetermined load current threshold is exceeded.

4. A power supply system according to claim 1, wherein said control means is connected to the respective control units of said first half-bridges and wherein said control means generates said common dephasing control signal based on the respective output signals of the load monitoring circuits of the control units of said first half-bridges.

5. A power supply system according to claim 1, wherein each second half-bridge has an output connected in series with a smoothing coil.

6. A power supply system according to claim 1, wherein each control unit includes a comparator which is connected to compare the output of the load monitoring circuit of that control unit to a reference signal, the output of said comparator adjusting the dephasing control signal applied to the dephaser means of that control unit.

7. A power supply system for use in providing DC power to multiple arc furnace electrodes and the like, comprising:
an AC power source,
a plurality of electrical loads each having a first terminal and a second terminal, the respective second terminals of said electrical loads being coupled so as to have a common polarity, a plurality of rectifier bridges each connecting a corresponding one of said electrical loads to said AC power source for supplying DC power to said electrical loads, each rectifier bridge including a respective set of controllable rectifiers arranged in a Graetz bridge configuration having a first half-bridge connecting said AC power source to said first terminal of the corresponding electrical load and a second half-bridge connecting said AC power source to said second terminal of the corresponding electrical load, a corresponding first control circuit connected to each first half-bridge, each first control circuit including a dephaser providing rectifier control signals to control inputs of the rectifiers of the corresponding first half-bridge, a first-terminal current monitoring circuit which monitors the DC current applied to the first terminal of the corresponding load, and a dephasing control signal circuit having an input connected to an output of said first-terminal current monitoring circuit and an output applying dephasing control voltage signals to said dephaser to adjust the phasing of said rectifier control signals in accordance with the intensity of the current monitored by said first-terminal current monitoring circuit, and a corresponding second control circuit connected to each second half-bridge, each second control circuit including a dephaser providing rectifier control signals to control inputs of the rectifiers of the corresponding second half-bridge and connected to a common dephasing control signal circuit which has an input connected to the respective outputs of the first-terminal current monitoring circuits of the first control circuits and which has an output providing a common dephasing control voltage signal to the respective dephasers of the second control circuits, said common dephasing control signal circuit setting the level of said common dephasing control voltage signal based on the values of the respective outputs of the first-terminal current monitoring circuits.

8. A power supply system according to claim 7, wherein each second control circuit includes a second-terminal current monitoring circuit which monitors the DC current applied to the second terminal of the corresponding load, and an individual dephasing control signal circuit which has inputs connected to the output of said common dephasing control signal circuit and said second-terminal current monitoring circuit and which has an output that applies, to the dephaser of said second control circuit, dephasing control voltage signals having a component based on the values of the outputs of the first-terminal current monitoring circuits of said first control circuits and a component determined by the output of said second-terminal current monitoring circuit.

9. A power supply system according to claim 7, wherein the dephasing control signal circuit of each first control circuit has a comparator which makes a comparison of a reference current signal and the output signal of the first-terminal current monitoring circuit of that first control circuit, and wherein the values of the dephasing control voltage signals applied to the dephaser of that first control circuit are varied in accordance with said comparison.

10. A power supply system according to claim 7, including means applying a signal corresponding to the greatest of the outputs of the respective first-terminal monitoring circuits to an input of a comparator, said comparator having another input connected to a default current reference signal source and an output which provides a control signal to said common dephasing control signal circuit.

* * * * *